C. G. DE LAVAL.
CHECK VALVE.
APPLICATION FILED JULY 31, 1915.
1,235,558.
Patented Aug. 7, 1917.
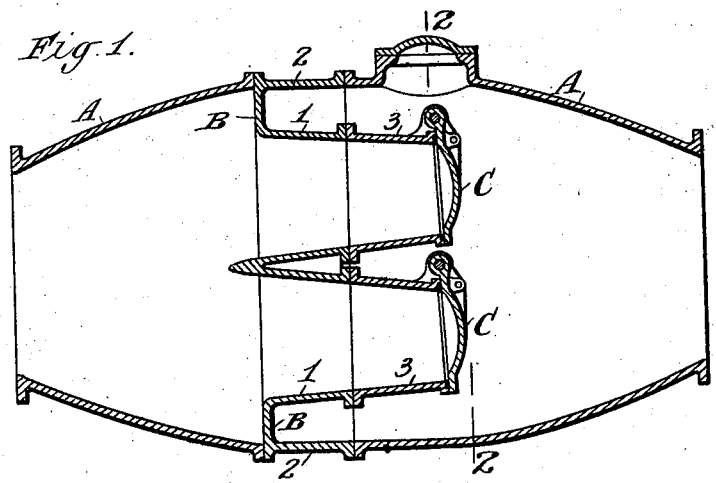
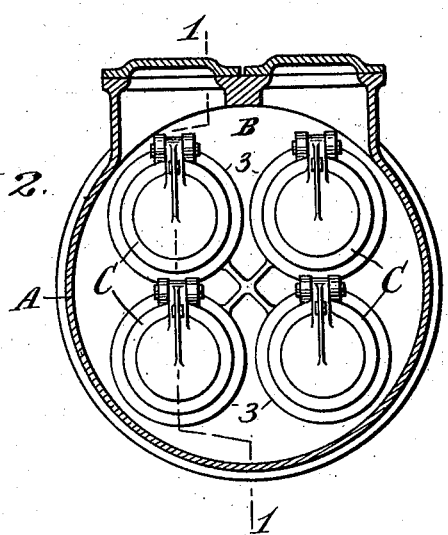
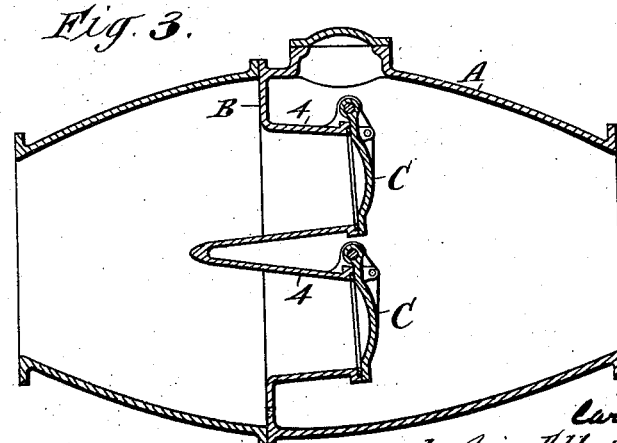
Inventor
Carl George de Laval
by his Attys

UNITED STATES PATENT OFFICE.

CARL GEORGE de LAVAL, OF ORANGE, NEW JERSEY, ASSIGNOR TO HENRY R. WORTHINGTON, A CORPORATION OF NEW JERSEY.

CHECK-VALVE.

1,235,558. Specification of Letters Patent. Patented Aug. 7, 1917.

Application filed July 31, 1915. Serial No. 42,997.

*To all whom it may concern:*

Be it known that I, CARL GEORGE DE LAVAL, a citizen of the United States, residing at Orange, county of Essex, and State of New Jersey, have invented certain new and useful Improvements in Check-Valves, fully described and represented in the following specification and the accompanying drawings, forming a part of the same.

This invention relates especially to check valves of the type used on the discharge outlets of water pumps, although the invention may be applied also in check valves for other uses.

The object of the invention is to provide a check valve in which the loss of head or pressure due to the check valve is reduced, thus securing a possible increased capacity of a pump operating under constant conditions, or a lower horse-power consumption for delivering the same amount of water against the same head, as compared with systems using the ordinary check valves.

I have discovered that by using a Venturi-like approach to the check valve, the losses produced are much less than with the ordinary check valve, and the invention consists in a check valve construction using such a Venturi-like approach for directing the water to the check valve.

The invention is applicable to a check valve construction having a single check valve, but preferably a multiple check valve construction will be used having a plurality of valves in a single casing, each valve with its Venturi-like approach.

In the accompanying drawing forming a part of this specification, the invention is illustrated as applied in preferred forms to multiple check valves, and this construction will now be described in detail and the features forming the invention then particularly pointed out in the claims.

In the drawings—

Figure 1 is a longitudinal section of a check valve embodying the invention, the section being on the line 1—1 of Fig. 2;

Fig. 2 is a section on the line 2—2 of Fig. 1, and

Fig. 3 is a view similar to Fig. 1, showing a slight modification.

Referring to the drawings, A is the casting forming the valve casing and having the usual open ends of equal size for attachment of the pipe upon which the valve is to be placed, and being enlarged centrally for increasing the cross area to accommodate the valves.

Within the casing A, and upon the diaphragm B, are mounted the check valves C, which are shown as of a common type of swinging valve closing by its weight. It will be understood, however, that any other suitable form of valve proper may be used. The diaphragm B, instead of being formed, as usual, solely to provide seats for the check valves, is formed so as to provide for each valve C a Venturi-like approach upon the outlet or smaller end of which each valve seats, and from which the water passes into the larger portion of the casting A and through the contracting portion of the valve casing to the check valve outlet.

The detail construction of the casing, diaphragm B, and the Venturi-like approach tube may be varied widely. As shown in Fig. 1, the diaphragm B with the inlet portions 1 of the Venturi-like approach tubes is formed integral with a section 2 of the casing A, and the outlet portions 3 of the Venturi-like approach tubes are made separate and secured to the outlet ends of the portions 1.

In Fig. 3 the diaphragm B is made integral with the outlet portion of casing A and integral with the Venturi-like approach tubes 4.

The term "Venturi" is used in this specification with the significance usual in this art as referring to a conical converging tube whose length is at least twice the diameter of the smaller opening of the tube and whose slope is neither so great as to give a small coefficient of discharge, nor so small as to give a small coefficient of velocity. In such a tube, the length must not be so short as to give a great loss by friction due to the formation of eddies and, on the other hand, the length must not be so great as to set up an excessive wall friction. Venturi found that tubes formed within the limits set forth above gave improved efficiencies, and his name has been applied by the art to such tubes. By the application of such tubes to check valves, I have been able to obtain not only the advantage of a high coefficient of discharge, but also of a high energy in operating the valve.

It will be understood that the invention may be applied with a plurality of valves on a single Venturi-like approach tube, instead of with a separate Venturi-like approach tube for each valve, but a higher efficiency, as well as greater certainty of action, is secured with a separate Venturi-like approach for each valve.

What is claimed is:

1. A check valve having a Venturi-like approach for the fluid to the movable valve.

2. A multiple check valve having a plurality of valves and having a separate Venturi-like approach for the fluid to each of the valves.

3. A check valve having a conical converging tube arranged as an approach for fluid to the movable valve, this tube having its length greater than twice the diameter of the opening of its smaller end.

In testimony whereof, I have hereunto set my hand, in the presence of two subscribing witnesses.

CARL GEORGE DE LAVAL.

Witnesses:
W. J. FRITCHMAN,
H. T. HEDDEN.

Copies of this patent may be obtained for five cents each, by addressing the "Commissioner of Patents, Washington, D. C."